United States Patent [19]

Salcudean

[11] Patent Number: 5,059,789
[45] Date of Patent: Oct. 22, 1991

[54] OPTICAL POSITION AND ORIENTATION SENSOR

[75] Inventor: Septimiu E. Salcudean, Vancouver, Canada

[73] Assignee: International Business Machines Corp., Armonk, N.Y.

[21] Appl. No.: 601,149

[22] Filed: Oct. 22, 1990

[51] Int. Cl.$^5$ .............................................. G01J 40/14
[52] U.S. Cl. .................................. 250/206.1; 250/561
[58] Field of Search ................... 250/561, 206.1, 206.2; 356/141, 152

[56] References Cited

U.S. PATENT DOCUMENTS

| | | | |
|---|---|---|---|
| 3,641,347 | 2/1972 | Kubo et al. | 250/206.2 |
| 4,396,945 | 8/1983 | DiMatteo et al. | 358/107 |
| 4,435,837 | 3/1984 | Abernathy | 382/41 |
| 4,576,481 | 3/1986 | Hansen | 356/375 |
| 4,623,253 | 11/1986 | Okutani et al. | 356/375 |
| 4,662,752 | 5/1987 | Tucker et al. | 356/375 |
| 4,744,664 | 5/1988 | Offt et al. | 356/375 |
| 4,753,569 | 6/1988 | Pryor | 250/206.2 |
| 4,766,322 | 8/1988 | Hashimoto | 250/561 |
| 4,866,362 | 9/1989 | Parker et al. | 318/368.1 |
| 4,874,998 | 10/1989 | Hollis, Jr. | 318/568.21 |

OTHER PUBLICATIONS

Brennemann et al., "Robot Position and Orientation Sensor", IBM Technical Disclosure Bulletin, vol. 26, No. 9, Feb. 1984, pp. 4457-4462.
Hollis et al., "Non-Contact Sensor For Two-Dimensional Translation and Rotation", IBM Technical Disclosure Bulletin, vol. 30, No. 7, Dec. 1987, pp. 33-34.
Kostamovaara et al., "Method for Industrial Robot Tracking and Navigation Based on Time-of-Flight Laser Rangefinding and the Position Sensitive Detection Technique", SPIE, vol. 1010, Industrial Inspection (1988), pp. 92-99.

Primary Examiner—David C. Nelms
Assistant Examiner—Khaled Shami
Attorney, Agent, or Firm—Perman & Green

[57] ABSTRACT

An optical position determination system is described which determines the six degrees of freedom (i.e. position of orientation) of an object with respect to a two-dimensional position sensing detector. The system comprises at least three energy beams physically connected to the object and directed to corresponding points of incidence on a surface of the position sensing detector. The energy beams are selectively energized to enable the position sensing detector to provide outputs indicative of the positions of the points of incidence. A microcomputer is responsive to those outputs to calculate the position of their common point of intersection. A single position sensing detector is thereby able to provide complete, three-dimensional information on the position of the object.

8 Claims, 2 Drawing Sheets

OPTICAL POSITION AND ORIENTATION SENSOR

FIELD OF THE INVENTION

This invention relates to an optical position determination system and more particularly to a six degrees of freedom optical position and orientation detecting and measuring system.

BACKGROUND OF THE INVENTION

There are a wide range of applications where it is necessary to obtain both translational and rotational offsets between two bodies, preferably without physical contact. The prior art has accomplished such relative position sensing by using a variety of optical systems. Many have used combinations of light emitting diodes and photoreceptors to determine a relative position between two objects by sensing the amount of light falling on the photoreceptor. Such systems are shown in U.S. Pat. No. 4,766,322 to Hashimoto, U.S. Pat. No. 4,623,253 to Okutani, and U.S. Pat. No. 4,435,837 to Abernathy.

Others have employed video cameras and light sources, however, such devices are generally bulky, expensive and relatively slow, due to the video scan rate and time taken to process the data, (for instance, see U.S. Pat. No. 4,744,664 to Offt et al. and U.S. Pat. No. 4,396,945 to DiMatteo et al.).

More recently, position sensing systems have begun to use light emitting diodes with both four-quadrant position-sensitive sensors and lateral effect photodiodes. A four-quadrant sensor is a device having photosensitive receptors at four-quadrants each of which is separated by a small non-sensing region. So long as a beam spot is either centered in the non-sensing region or is equally centered on the four-quadrants, equal voltages are sensed and the position of the spot can be detected. Such a detector provides position information only up to the point where the edge of the spot reaches the detector gap. Thereafter, the spot is known to be in a particular segment but it is not known exactly where.

The lateral-effect photodiode comprises a single, active planar element. The position of the centroid of a light spot is derived by sensing photon-generated electrons within the substrate of the device. This is achieved by measuring the currents through multiple ohmic contacts around the periphery or on the back layer of the device. Ideally, the position of the light spot with respect to a middle axis separating two opposing lateral contacts is given by the ratio of the difference to the sum of the currents flowing through these contacts.

Such devices are made for both single dimensional and two dimensional tracking. The two dimensional tracking device has contacts placed about the four sides of a generally rectangular or square planar sensing area. The use of such types of sensors is generally discussed in an article by Kostamovaara et al., entitled "Method for Industrial Robot Tracking and Navigation Based on Time-of-Flight Laser Range Finding and the Position Sensitive Detection Technique". SPIE, Vol. 1010, Industrial Inspection (1988) pp. 92-99.

In U.S. Pat. No. 4,662,752 to Tucker et al. and U.S. Pat. No. 4,866,362 to Parker et al. target tracking systems are described wherein light beams corresponding to individual orthogonal axes are reflected off a target and onto individual, lateral-effect position sensing diodes (PSD's). The resultant of the signals from the reflected beams is used to indicate the target's position. In U.S. Pat. No. 4,576,481 to Hansen, a similar position sensing system using PSD's is shown wherein the detection of two or more targets may be accomplished by using light emitting diodes of different wavelengths, with each target having a retro reflector which includes a band pass filter that allows reflection of only one of the LED wavelengths.

Additional prior art has shown that PSD's can be used for both two and three-dimensional tracking of objects. By two dimensional tracking is meant the measurement of the position and orientation of an object constrained to move in a plane; by three-dimensional tracking is meant the measurement of all degrees of freedom (three translational and three rotational) of a rigid body moving in space. In all instances known to the inventor, such systems have suggested the use of a single, two dimensional PSD for two dimensional tracking and a plurality of PSD's for additional axes of movement. Such prior art can be found in U.S. Pat. No. 4,874,998 to Hollis Jr. and in "Robot Position and Orientation Sensor", Brennemann, Jr. et al., IBM TDB Vol. 26, No. 9, Feb. 1984, pp. 4457-4462 and "Non-Contact Sensor for Two-Dimensional Translation and Rotation", Hollis et al., IBM TDB Vol. 30, No. 7, Dec. 1987, pp. 32, 34.

While PSD's do provide excellent position sensing signals they are expensive and can range in cost from $90 for an active area of one centimeter by one centimeter, up to $2700 (active area 2 cm×2 cm) and higher. Thus it is most desirable that the number of PSD's required for positional sensing be minimized. Furthermore, digital processing is required to accomplish the mathematics required to determine the position of an object and an analog-to-digital converter channel is required for each PSD axis. As a result, limiting the number of PSD's enables substantial cost savings in associated electronic equipment. Finally, where multiple PSD's are employed for positional sensing, the mechanical alignment thereof can be difficult and is subject to error if not accomplished carefully.

Accordingly, it is an object of this invention to provide a three-dimensional position sensor which employs only a single two-dimensional PSD.

It is a further object of this invention to provide a three-dimension position sensor which is less costly and less prone to mechanical alignment errors than those exhibited in the prior art.

It is still another object of this invention to provide a six degree of freedom position sensor with unlimited motion range about one axis of rotation.

SUMMARY OF THE INVENTION

An optical position determination system is described which determines the three dimensional position of an object with respect to a two-dimensional position sensing detector (PSD). The system comprises energy sources physically connected to the object for directing at least three energy beams to points of incidence on a surface of the PSD. The beams are selectively energized to enable the PSD to provide outputs indicative of the positions of the points of incidence. A microcomputer is responsive to those outputs to calculate the position and orientation of the object with respect to the PSD. A single PSD is thereby able to provide complete, three-dimensional information on the position of the object.

DETAILED DESCRIPTION OF THE INVENTION

Figure 1:
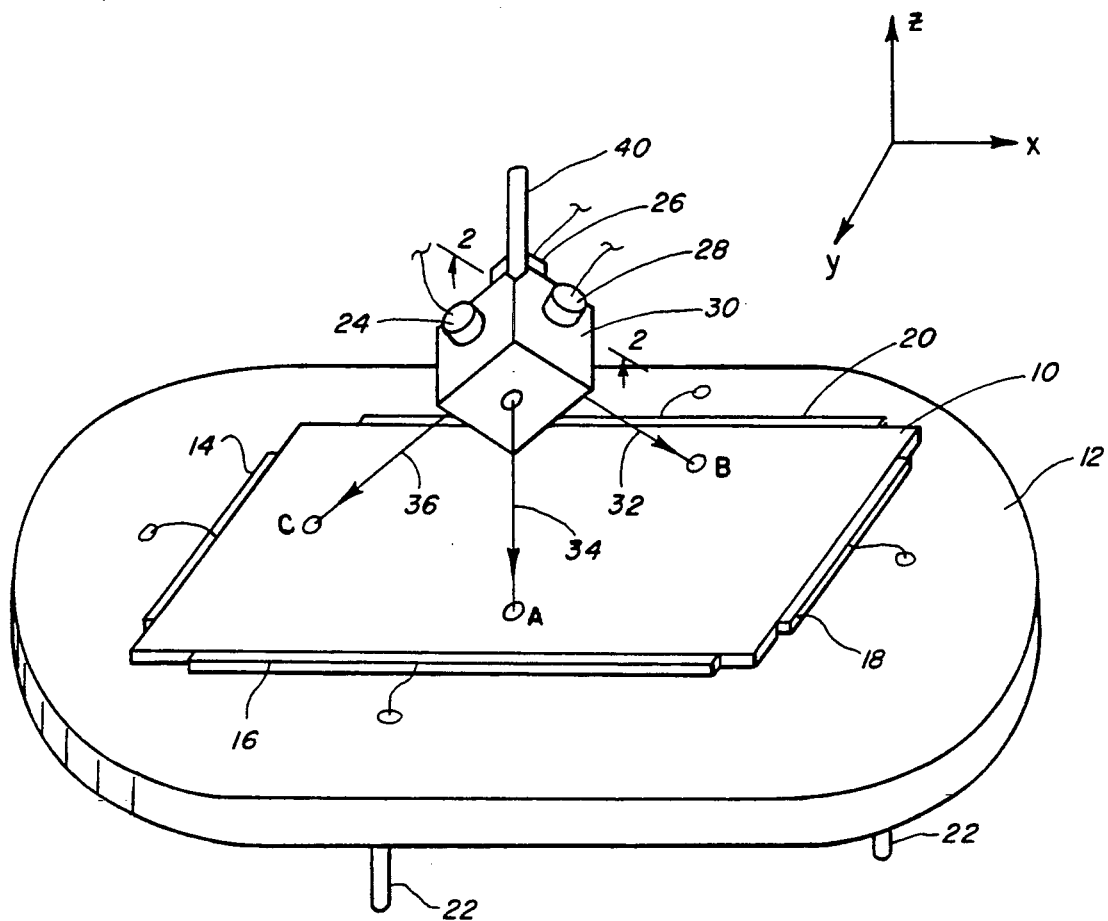
FIG. 1 is a perspective view of a preferred embodiment of an optical position determination system incorporating the invention hereof.

Referring now to FIG. 1, a two dimensional PSD 10 is mounted on a substrate 12. Contacts 14, 16, 18, and 20 are associated with the respective edges of PSD 10, and each is connected to an output pin 22. PSD 10 and substrate 12 are affixed to a first body (not shown) which may be either fixed or movable.

Three light emitting diodes (e.g. laser diodes) 24, 26, and 28 are mounted in a solid block 30, which is comprised of metal, plastic, or any other dark material that can be machined. Diodes 24, 26, and 28 are oriented in such a manner that their emission axes result in an orthogonal tripod of light beams 32, 34, and 36, which beams are incident on PSD surface 10 at points B, A, and C respectively. Block 30 is connected by a rigid member 40 to a second body (not shown).

Figure 2:
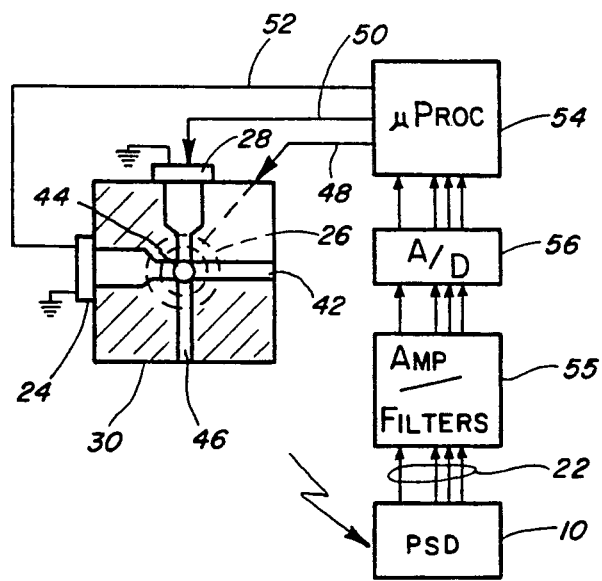
FIG. 2 is a sectional view of the energy source means in FIG. 1, taken along line 2—2 along with the circuitry for rendering the invention operational.

Referring now to FIG. 2, block 30 is shown in section and shows the positioning of light channels 42, 44, and 46 that provide for orthogonal beams of 32, 34, and 36 respectively. Diodes 24, 26, and 28 are each connected to a microprocessor 54, which controls their energizations via conductors 48, 50 and 52. Microprocessor 52 can be replaced by a special purpose controller, if desired.

In order to determine the position of the beam projections on the surface of PSD 10 (points A, B, and C), light beams 32, 34, and 36 are modulated by microprocessor 54. The objective of the modulation is to enable the position of each point of incidence on PSD 10 to be unambiguously determined via outputs detected from pins 22 (see FIG. 1). One way of accomplishing this is to time-domain multiplex diodes 24, 26, and 28 by flashing them in sequence and employing synchronized detection of the resulting signals on pins 22. In specific, microprocessor 54 sequentially energizes lines 48, 50, and 52 to cause each of light beams 32, 34, and 36 to be "on" for a discrete period of time. As each beam is incident on PSD 10, currents and flow through pins 22. These currents are amplified, conditioned in amplifier 55 and then applied to analog to digital converter 56 and from there to microprocessor 54. Each digital, measured voltage value is stored by microprocessor 54 in conjunction with an identification of the particular sensed beam. The next beam is then energized (e.g., via line 50) and the process is repeated.

An alternative method for distinguishing the light beams is to modulate each of light emitters 24, 26, and 28 at a different frequency and to employ band-pass filtering. Such band-pass filtering enables microprocessor 54 to identify the input voltage which corresponds to a specifically modulated light beam and to differentiate its digital values from other, different frequency modulations.

While block 30 is shown as having a common point of intersection of light beams 32, 34, and 36 internal to its structure, the light emitters could be mounted so as to face outwardly from the exterior surfaces of block 30 such that there would be no actual common intersection of the light beams. In such a case, the calculations, to be hereinafter described, would construct projections of the beams to an imaginary common point of intersection, so as to enable a relative determination to be made of the position of that imaginary point relative to the surface of PSD 10.

Figure 3A:
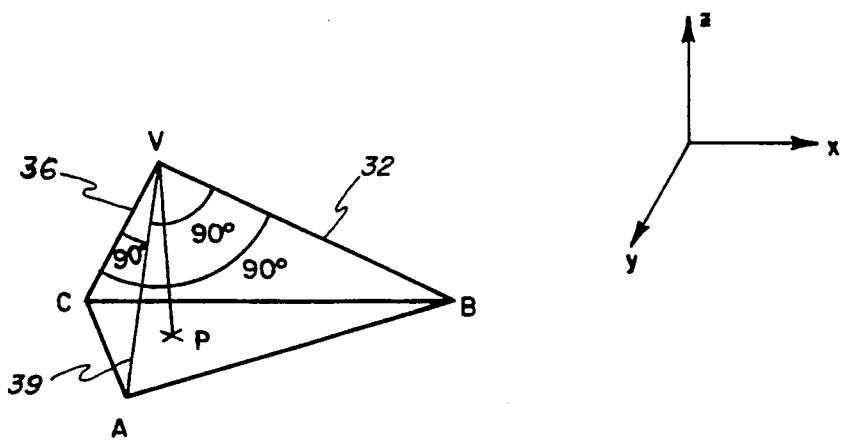
FIGS. 3a–3c are a geometric constructs helpful in understanding the mathematics required to identify the position and orientation of the energy source means in FIG. 1.
Figure 3B:
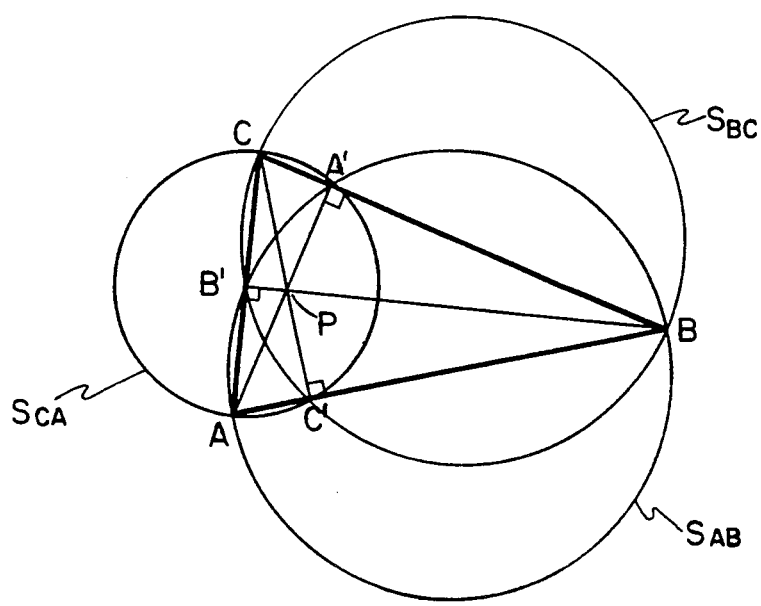
Figure 3C:
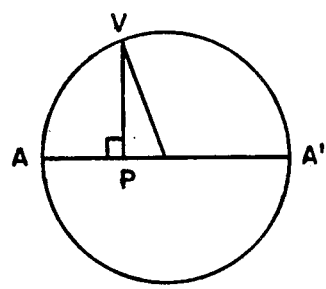

Referring now to FIGS. 3a, 3b, and 3c, one method will be described for calculating the common point of intersection of projections of beams 32, 34, and 36. In FIG. 3a, point V is the intersection of the aforementioned beams, with points A, B, and C being the points of incidence of the respective beams on the surface of PSD 10. In FIG. 3b, a plan view of the plane ABC defined by points A, B, and C is shown, with A', B', and C' being respectively, the orthogonal projections of point A on line segment BC, point B on line segment CA, and point C on line segment AB. Point P is the projection of vertex V onto plane ABC and coincides with the intersection of lines AA', BB', and CC'.

It will be understood by those skilled in the art, that vertex V lies at an intersection of three spheres, $S_{AB}$, $S_{BC}$, $S_{CA}$ whose diameters are AB, BC, and CA, respectively. Thus, the intersection of the spheres $S_{AB}$ and $S_{BC}$, $S_{BC}$ and $S_{CA}$, and $S_{CA}$ and $S_{AB}$ define circles $C_{BB'}$, $C_{CC'}$, and $C_{AA'}$, respectively which lie in planes perpendicular to ABC. Those circles have diameters B-B', C-C', and A-A', respectively. For example, it helps to picture the intersection between spheres $S_{CA}$ and $S_{AB}$ as similar to the intersection of two soap bubbles, where line A-A' is the planar projection of the circle which defines their intersection. A plan view of circle A-A', with vertex V and its projection P, is shown in FIG. 3C, and it can be seen there that vertex V resides on its circumference.

Hereinafter is outlined a procedure for calculating the position and orientation of the object to which the LED beams are attached with respect to the PSD:

For any vector $\vec{MN}$, let $||\vec{MN}||$ denote its Euclidean norm (length), i.e., $$||\vec{MN}|| = \sqrt{\vec{MN}^T \vec{MN}}.$$

It then may be shown that $$\vec{AA'} = \vec{AC} - \frac{\vec{AC}^T \vec{BC}}{||BC||^2} \vec{BC} \quad (1)$$

$$\vec{BB'} = \vec{BA} - \frac{\vec{BA}^T \vec{CA}}{||CA||^2} \vec{CA} \quad (2)$$

The orthogonal projection P of the vertex V on the plane ABC is the same as the intersection of AA', BB', and CC', and can be obtained by solving $$\vec{AP} = \lambda_A \vec{AA'} = \vec{AB} + \lambda_B \vec{BB'} \quad (3)$$

for $\lambda_A$. Multiplying (3) from the left by $AC^T$ and using the fact that AC is perpendicular to BB', i.e., $AC^T BB' = 0$ $$\vec{AP} = \frac{\vec{AC}^T \vec{AB}}{\vec{AC}^T \vec{AA'}} \vec{AA'} \qquad (4)$$

The position of V with respect to A (i.e. translational offset between the object and the PSD) is then given by $$\vec{AV} = \vec{AP} + \frac{\vec{AB} \times \vec{AC}}{||\vec{AB} \times \vec{AC}||} \sqrt{\tfrac{1}{4}||\vec{AA'}||^2 - (\tfrac{1}{2}||\vec{AA'}|| - ||\vec{AP}||)^2} \qquad (5)$$

The orientation offset between the PSD and the rigid body carrying the LED beams is completely specified by the following rotation matrix:

$$Q = \begin{bmatrix} \dfrac{\vec{VA}}{||\vec{VA}||} & \dfrac{\vec{VB}}{||\vec{VB}||} & \dfrac{\vec{VC}}{||\vec{VC}||} \end{bmatrix}$$

The above mathematical determination of the translational and rotational offsets of the LED-carrying object with respect to the PSD is based upon orthogonal and intersecting beams 32, 34, and 36. Other angular orientations with intersecting or non-intersecting beams can also be utilized, but, as is known to those skilled in the art, the mathematical process for finding these offsets is more complex. In brief, the process involves a numerical solution of nonlinear equations of a set arising by expressing the points of beam incidence on the PSD active surface in PSD and LED-carrying object coordinates (by methods due to Newton-Raphson, Broyden, Powell, quasi-Newton methods, the "BFGS" algorithm, etc.). See, for example, J. Stoer & R. Bulirsch, "Introduction to Numerical Analysis", Springer-Verlag, N.Y., 1980).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An optical position determination system for determining the relative position of an object with respect to a two-dimensional position sensing detector comprising:
   energy source means connected to said object for directing at least three energy beams to points of incidence on said position sensing detector;
   means connected to said energy source means for characterizing each said energy beam, whereby said position sensing detector provides outputs which are indicative of the position of each said point of incidence; and
   computer means responsive to said outputs for calculating the position and orientation of said object.

2. The optical position determination system of claim 1 wherein each said energy beam is pointed in a direction orthogonal to others of said energy beams.

3. The optical position determination system of claim 1 wherein lines coincident with the energy beams intersect.

4. The optical position determination system of claim 2, wherein said beam characterization comprises sequentially energizing said energy beams to provide sequential outputs from said position sensing device, said sequential outputs indicative of the location of said points of incidence.

5. The optical position determination system of claim 2, wherein said beams are characterized by modulating each said beam at a different frequency, whereby said position sensing detector provides differing frequency outputs which are indicative of the locations of said points of incidence.

6. The optical position determination system of claim 1, wherein said energy source means comprises:
   support means; and
   at least three light emitters mounted on said support means, for generating three beams of light towards said position sensing detector, each said light beam oriented orthogonally with respect to others of said beams.

7. The optical position determination system of claim 6 wherein said three light emitters are mounted on said support means so that said beams define a common point of intersection which is internal to said support means.

8. The optical position determination system of claim 7 wherein said support means comprises:
   a cube having three intersecting channels formed therein; and
   a diode light emitter mounted at one extremity of each said channel, whereby each said channel directs a light beam from a said diode to said position sensing detector.

* * * * *